UNITED STATES PATENT OFFICE.

ELIZABETH ANN TOMPKINS, OF SING SING, NEW YORK.

IMPROVEMENT IN FOOD FOR BIRDS.

Specification forming part of Letters Patent No. 148,632, dated March 17, 1874; application filed February 16, 1874.

*To all whom it may concern:*

Be it known that I, ELIZABETH ANN TOMPKINS, of Sing Sing, Westchester county, New York, have invented an Improved Bird-Feed; and I do hereby declare the following to be a full and correct description of the same.

My invention relates to a preparation of food for canary and other seminivorous birds; and consists in mixing the kinds of seeds most suitable for the birds to be fed with sand, gravel, cuttle-fish, &c., (which it is also necessary to feed them,) and with flour or other glutinous substance, so that the mass, when mixed with water, can be fashioned into cakes of any desired shape while in a plastic state, and when dried will become hard and rigid, but not so hard but that the bird can pick it to pieces and eat the seed, sand, &c, as they please, especially when the cake is a little moistened.

To produce my improved bird-feed, I take canary, hemp, rape, and other seeds in a proportion most suited to the habits of the bird to be fed, and add a quantity of sand, ground cuttle-fish, or gravel, and also flour or any sticky substance not deleterious to the birds and mix the whole with water until it forms a paste-like mass of the consistency of putty. This I then form into shape by means of molds or otherwise, and allow the cakes to dry for use.

This mode of feeding birds is found to be a very economical way, besides being healthful to them and amusing to those who observe them.

Having fully described my invention, what I claim, and desire to secure by Letters Patent, is—

As a new article of manufacture, a molded and dried cake of bird-feed, consisting of one or more kinds of seed mixed with sand and a glutinous substance, substantially as described.

The above specification of my said invention signed and witnessed, at Sing Sing, this 13th day of February, A. D. 1874.

ELIZABETH ANN TOMPKINS.

Witnesses:
 RUSSEL BARNUM,
 HENRY C. NELSON.